United States Patent [19]

Hall

[11] Patent Number: 5,842,463
[45] Date of Patent: Dec. 1, 1998

[54] PORTABLE WOOD BURNING CAMP STOVE

[76] Inventor: John Battaile Hall, 14377 NW. McNamee Rd., Portland, Oreg. 97231

[21] Appl. No.: 662,672

[22] Filed: Jun. 14, 1996

[51] Int. Cl.$^6$ .......................................................... F24C 1/16
[52] U.S. Cl. ........................ 126/9 R; 126/15 R; 126/913; 126/29
[58] Field of Search ................................ 126/9 R, 25 R, 126/65, 29, 4, 15 R, 9 B, 25 B

[56] References Cited

U.S. PATENT DOCUMENTS

| | | |
|---|---|---|
| 936,482 | 6/1909 | Seeley . |
| 1,238,080 | 8/1917 | Ball . |
| 1,298,762 | 8/1919 | Milligan . |
| 1,391,415 | 1/1921 | Schonitzer . |
| 1,487,474 | 7/1924 | Rhodes . |
| 1,508,334 | 5/1924 | Ingalls . |
| 2,517,254 | 7/1950 | Steele . |
| 2,530,721 | 3/1950 | Perlman . |
| 2,607,334 | 6/1952 | Perlman . |
| 2,756,738 | 5/1956 | Kratz . |
| 3,848,577 | 11/1974 | Storandt . |
| 3,868,943 | 3/1975 | Hottenroth et al. ................. 126/9 R X |
| 4,604,986 | 8/1986 | Barnes ................................. 126/9 R X |
| 4,722,322 | 2/1988 | Varney et al. ....................... 126/9 R X |
| 4,909,237 | 3/1990 | Karpina . |
| 4,915,091 | 4/1990 | Varney ................................. 126/9 R X |
| 5,230,325 | 7/1993 | Williams . |
| 5,284,126 | 2/1994 | Varney ..................................... 126/9 R |
| 5,363,977 | 11/1994 | Hoff . |
| 5,425,352 | 6/1995 | Gillam et al. . |

FOREIGN PATENT DOCUMENTS

| | | |
|---|---|---|
| 580829 | 5/1924 | France . |
| 599185 | 3/1934 | Germany . |
| 11961 | 4/1925 | Switzerland . |
| 2475 | 2/1916 | United Kingdom . |
| 117757 | 4/1918 | United Kingdom . |

*Primary Examiner*—Larry Jones
*Attorney, Agent, or Firm*—Peter Staples

[57] ABSTRACT

Portable camp stove, wherein solid-fuel, especially of dried tree and bush twigs, is burned upon a supporting fuel grate positioned at bottom of a combustion-chamber. Solid-fuel is added directly into the combustion-chamber during operation through alligned stoke holes in a chimney and a vented-fire-ring, and then dropped vertically downward through an exhaust vent. Air for primary combustion is drawn into the combustion-chamber through a ring of intake apertures adjacent to and above the stove's bottom plate. Stove's outer wall is spaced apart from the wall of the combustion-chamber and the two walls are joined together and sealed by a top plate, creating an adjacent confining airspace. Air enters into said airspace through a ring of secondary air intake apertures in stove's outer-wall, where it is heated by thermal communication, as heat emitted from combusting solid-fuel passes through the combustion-chamber wall. As air in confining airspace is heated, it expands and rises, and creates an environment of positive pressure. Thusly, heated air is propelled through a ring of aperture jets cut through the wall of the combustion-chamber, where said heated air mixes in the inner combustion-chamber with gases released and sent ascending with solid fuel combusting on the fuel grate. The stream of heated air, propelled directly into and mixing with ascending gases, induces a dramatic reignition of said gases. The heat and flames released first by combusted fuel and then by the reignited gases, can be focused on heating contents in a cook pot. Two cook pots joined together at rims encase stove for storage and transport.

6 Claims, 6 Drawing Sheets

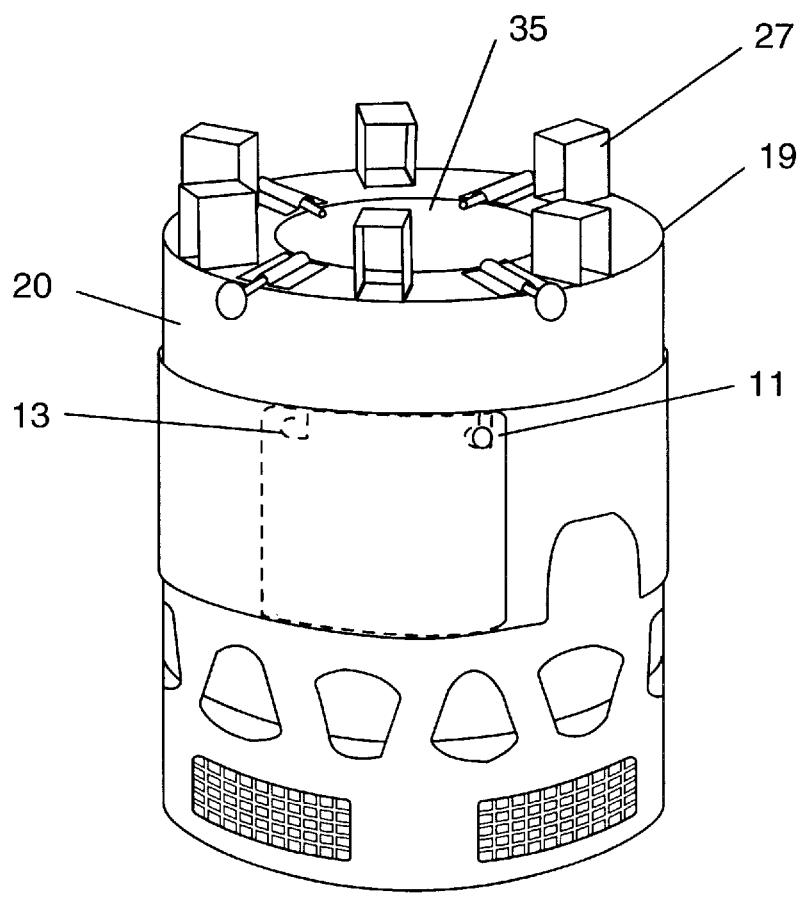
Fig 2
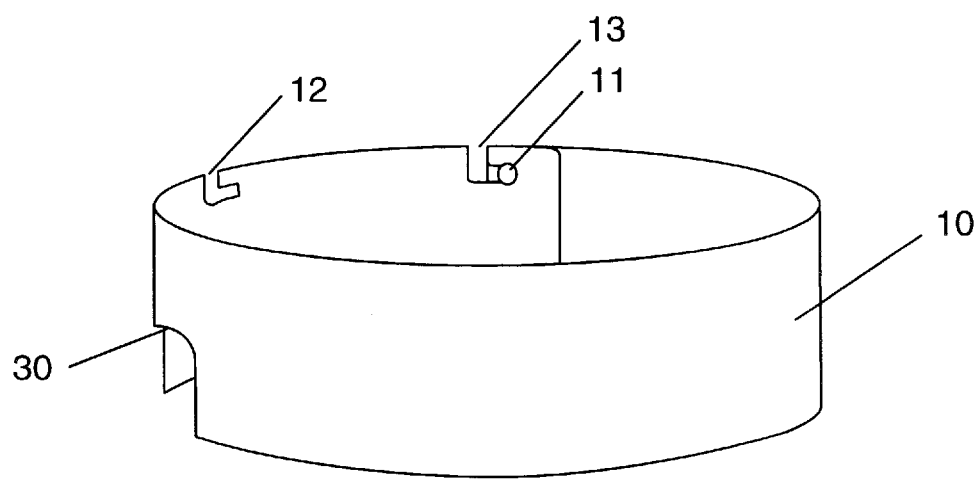
Fig 2-A

PORTABLE WOOD BURNING CAMP STOVE

BACKGROUND

1. Field of Invention

This invention relates to camp stove and more particularly to a portable camp stove that efficiently burns dried tree and bush twigs.

2. Description of Prior Art

Portable camp stoves that rely on wood and other fuels have been known for many years. The prior art has provided a variety of portable stoves for outdoor cooking and heating. Then there is another set of prior art considered. These are devices for igniting, combusting, and even making charcoal for cooking and heating purposes.

GRILLS, CHARCOAL-IGNITERS, AND CHARCOAL-MAKERS

Prior art of grills, charcoal-igniters, and charcoal-makers rely on a flue effect, with fresh air drawn in from below or from sides. After combustion, heated air and combustion gases are emitted through an upper opening or openings. A grate supports solid-fuel as it is combusted, and which allows for circulation of air around the solid-fuel.

U.S. Pat. No. 3,848,577 to Storandt (1974) is based on the flue effect, but relies on single wall construction and thus does not have a structural member for confining and heating air that can be used in reigniting gases released in primary combustion.

U.S. Pat. No. 5,363,977 to Hoff (1994) is based on the flue effect. Vents 34 in wall of central member 20 allow air for primary combustion of fuel in barbecue kettle 36. No structural member is depicted for heating confined air, causing it to expand and rise, and to reignite gases released in primary combustion.

U.S. Pat. No. 4,909,237 to Karpina (1990) discloses a two walled charcoal-maker and starter that is also based on the flue effect. An inner wall forms a loading hopper where charcoal is produced from buring wood in a reduced oxygen environment. An airspace between the inner wall of the loading hopper and an outer wall of heat shield 8 intends to protect handle 10 and to prevent the loading hopper from becoming too hot and burning through. The space is used for air circulation, and thus is not intended to heat confined air, causing it to expand and rise, and to reignite gases released in primary combustion.

U.S. Pat. No. 5,230,325 to Williams (1993) discloses a charcoal lighter device. The body is constructed to employ the flue effect. Air for combustion is drawn through a first series of spaced horizontal air holes 32 extending through a shell adjacent to a bottom in what also serves as a pre-ignition chamber. Fuel is combusted on a grate located above a first series of air holes. Air drawn into a second, similar series of horizontal slots or airholes 34 circulates between two sidewalls. Airspace 44 between the inner and outer sidewalls is designed to promote circulation of air, and is not intended to heat confined air, causing it to expand and rise, and to reignite gases released in primary combustion.

U.S. Pat. No. 5,425,352 to Gillam et al. (1995) discloses a portable and nestable grill that relies on the flue effect. Reduced circumference of a waiste section, defining a venturi, is noted to increase the velocity of heated air flowing through apertures 38 in restricted orfice of throat 58. Expanding gases are said to magnify convective heat transfer due to swirl and high velocity of an air pattern passing therethrough and around hot coals. Important to note is that this prior art relies on convective heat transfer to aid combustion rate of coals. There is no structural member for heating confined air, causing it to expand and rise, and to reignite gases released in primary combustion.

CAMP STOVES AND FIELD STOVES

U.S. Pat. No. 936,482 to Seeley (1909), United Kingdom Patent 2475 to Carpmael and Co. (1916), U.S. Pat. No. 1,238,080 to Ball (1917), United Kingdom Patent 117,757 to Fairbrother (1918), U.S. Pat. No. 1,487,474 to Rhodes (1921), U.S. Pat. No. 1,508,334 to Ingalls (1924), French Patent 580,829 to META-A.G. (1924), Swiss Patent 11961 to Held (1925), German Patent 599,185 to Ahlswede (1934), U.S. Pat. No. 2,517,254 to Steele (1950), and U.S. Pat. No. 2,756,738 to Kratz (1956) all rely on liquid fuel combustion devices, such as alcohol (Hartspiritus), gas burners and "Sterno," that are placed within an enclosure with vents intended to allow for air flow. None of the devices in this group of prior art are designed for combusting solid, ligneous fuels. Nor do those considered include structural members for confining air, heating and inducing its expansion, and then using said air for reigniting gases released in primary combustion.

SOLID-FUEL COMBUSTERS

U.S. Pat. No. 1,298,762 to Milligan (1919) discloses a camp stove with a single-walled body that relies on the flue effect. A grate for supporting combusting fuel is located in the lower portion of a stove body, above two rings of air intake vents 5 circumferentially spaced-apart. A short distance above the grate is a series of apertures 9 to provide air over the top of a fire to aid its combustion. A series of oblong apertures 10 are adjacent to the top of the stove body to emit combustion gases longitudionally. For burning wood or charcoal, stove's flue body can be turned either up or down, and wire mesh grating 8 that holds combusting fuels can be moved to the upper side of supporting pins 7. The single-bodied flue neither provides a structural member for heating and expanding air in a confining space between two walls, and then introducing it to gases released and ascending with primary combustion. Nor is there an opening for continuous stoking, that is, adding fuel without removing a cook pot that is being heated at the stove's top.

U.S. Pat. No. 1,391,415 to Schonitzer (1918) discloses a field stove with a fire-pot 1 in which solid-fuel such as wood is combusted. Solid-fuel can be stoked in through fire-door 2. However, Schonitzer's device fails to include structural members for confining and heating air so that said air might be used to reignite gases freed in primary combustion.

U.S. Pat. No. 2,530,721 to Perlman (1950) is intended to spread heat over the larger suface of a can, so as to reduce the burning of contents. Perlman's device disclosed in 1950 is both structurally and functionally similar to his 1952 disclosure, and thus both can be understood and critiqued through the latter disclosure.

U.S. Pat. No. 2,607,334 to Perlman (1952) discloses a heater or stove that can be set up for use from a collapsed position. Its design provides for introducing solid-fuel when opening 12 is alligned with slide 13, without dismantling the device or interfering with the burning of fuel remaining on a hearth. Air is drawn in though ports 12, adjacent to surrounding walls of the hearth, and passes through a large number of perforations in shell 8. Products of combustion also pass outwardly through openings in the shell.

The vertical dimension of the shell causes unignited products of combustion rising from the hearth to strike the bottom of a can, containing contents to be heated, which acts as a baffle causing the unignited products of combustion to spread radially outward and through ports or openings in the baffle. Through inlet openings 15, air is drawn in for primary combustion.

While it could be construed that secondary combustion takes place, inlet ports 17 are designed for drawing in air by the force of suction created by the combined forces of combustion and the flue effect. However, Perlman's device exhibits no structural member for using primary combustion for heating air contained in an adjacent confining airspace, causing it to expand and rise, and to introduce it so as to reignite gases released in primary combustion.

OBJECTS AND ADVANTAGES

Accordingly, besides the objects and advantages of a utility construction for using heat released in primary combustion to heat air in an adjacent confining airspace between a combustion-chamber wall and an outer wall, and introducing said heated air through an annular ring of aperture-jets for promoting secondary combustion that takes the form of a dramatic reignition of gases released in primary combustion, several objects and advantages of the present invention are:

(a) to provide a stove which can be continously stoked with solid-fuel without removing the cook pot on top, or operating a slide for stoking in fuel;

(b) to provide a stove that does not require the space of a pre-ignition chamber, as pre-ignition takes place directly on fuel grate in combustion-chamber;

(c) to provide a stove whereby all attached and unattached members collapse down so that said stove with all of its members is securely and conveniently stored for transport when encased within two cook pots;

(d) to provide an attachable chimney which increases flame contact with sides of cook-pot;

(e) to provide a stove whereby ash from combustion is protected from wind dispersion by a wire mesh;

Further objects and advantages are to provide a stove which performs well and generates useable heat with fuels taken directly from Nature, especially twigs fallen from trees or bushes, of modest dimensions, close to the size of an adult's index finger, and in degrees of decomposition that allow for snapping said twigs to useable lengths by hand. Still further objects and advantages will become apparent from a consideration of the ensuing description and drawings.

DRAWING FIGURES

In the drawings, closely related figures have the same number but different alphabetic suffixes.

FIG. 2 shows a perspective view of the stove removed from the encasing cook pots in FIG. 1 and not yet operational.

FIGS. 2-A shows a perspective view of expanded chimney in FIG. 2.

Figure 1:
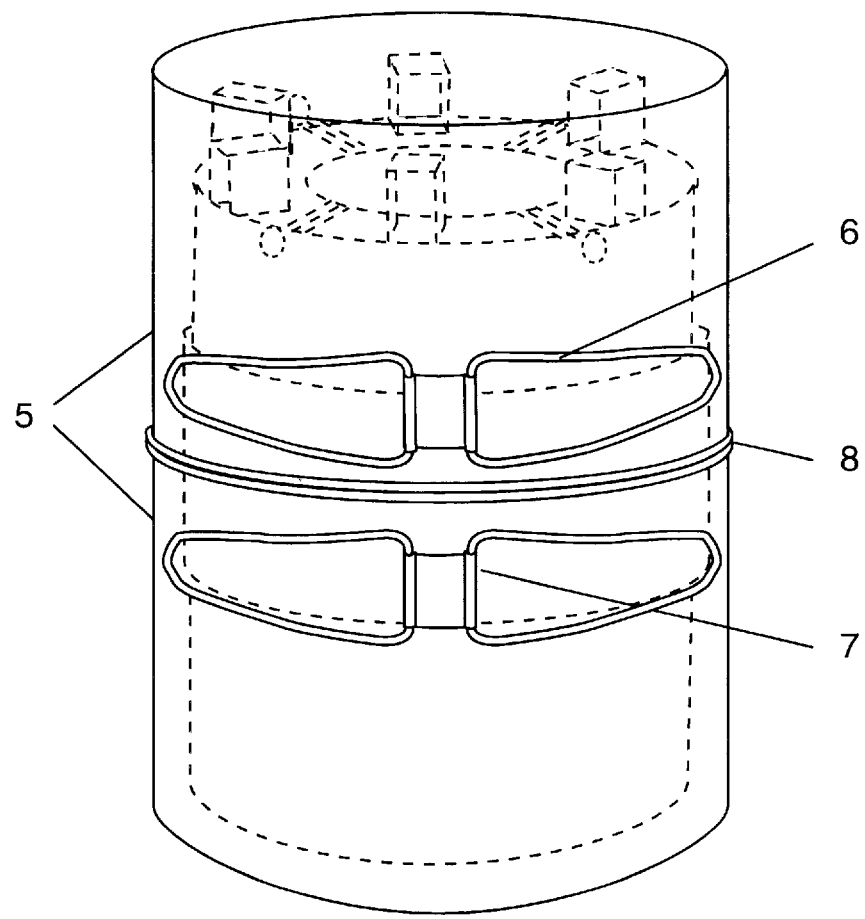
FIG. 1 shows a perspective view of two cook pots, and with outline of encased stove.
Figure 3:
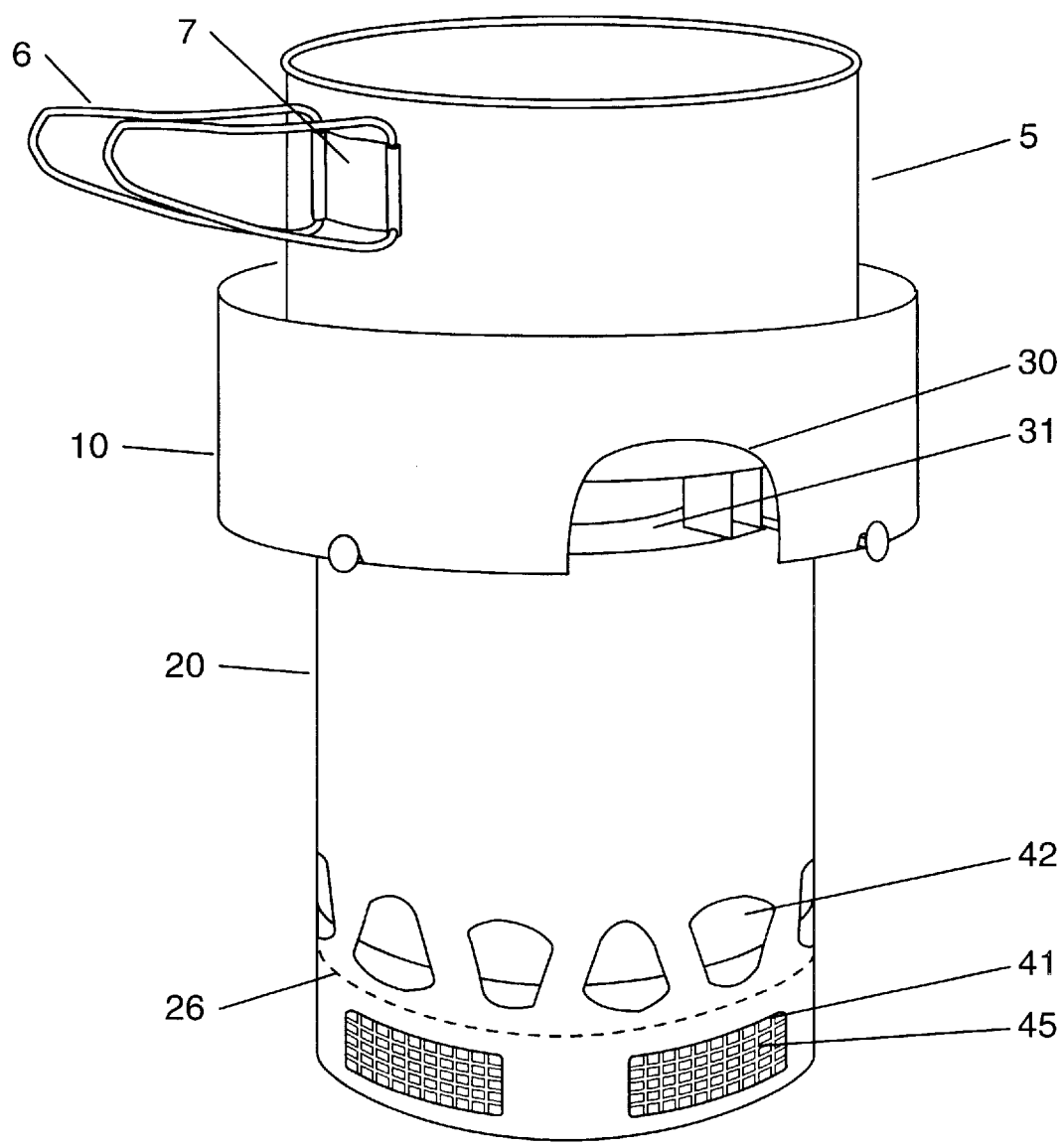

FIG. 3 shows a perspective view of stove in FIG. 2 set up for operation with one cook pot in FIG. 1 in cooking position.

Figure 4:
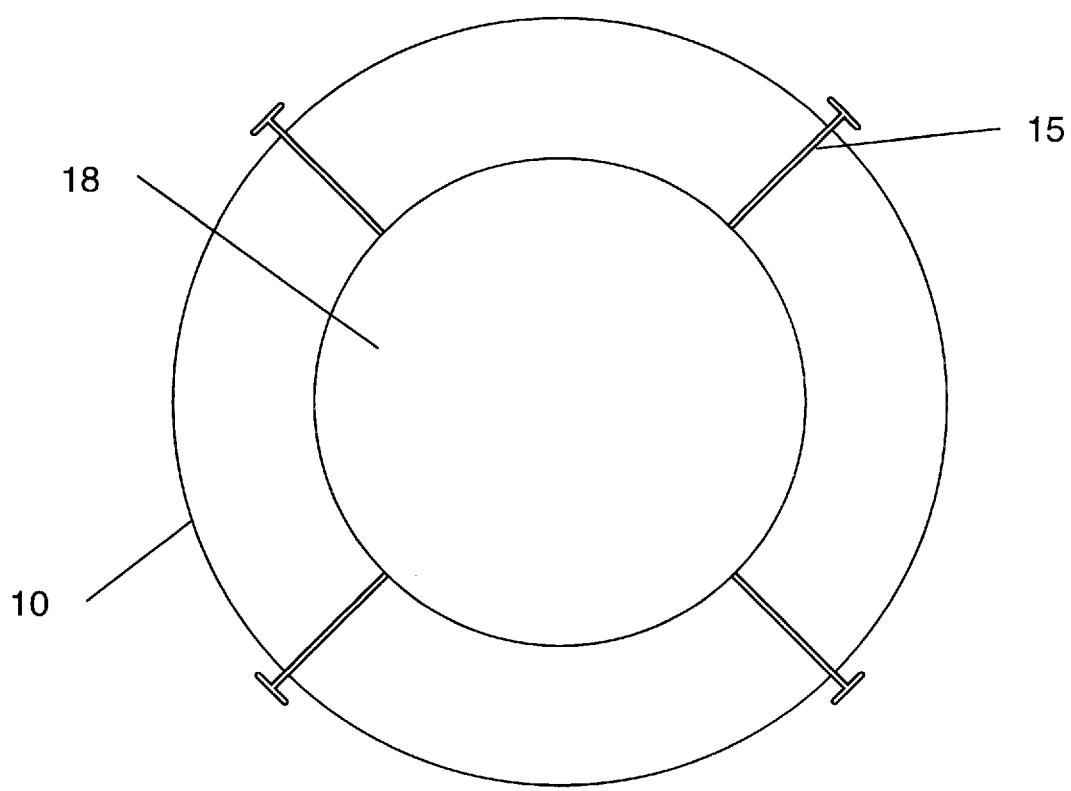

FIG. 4 shows a bottom plan view of FIG. 3.

Figure 5:
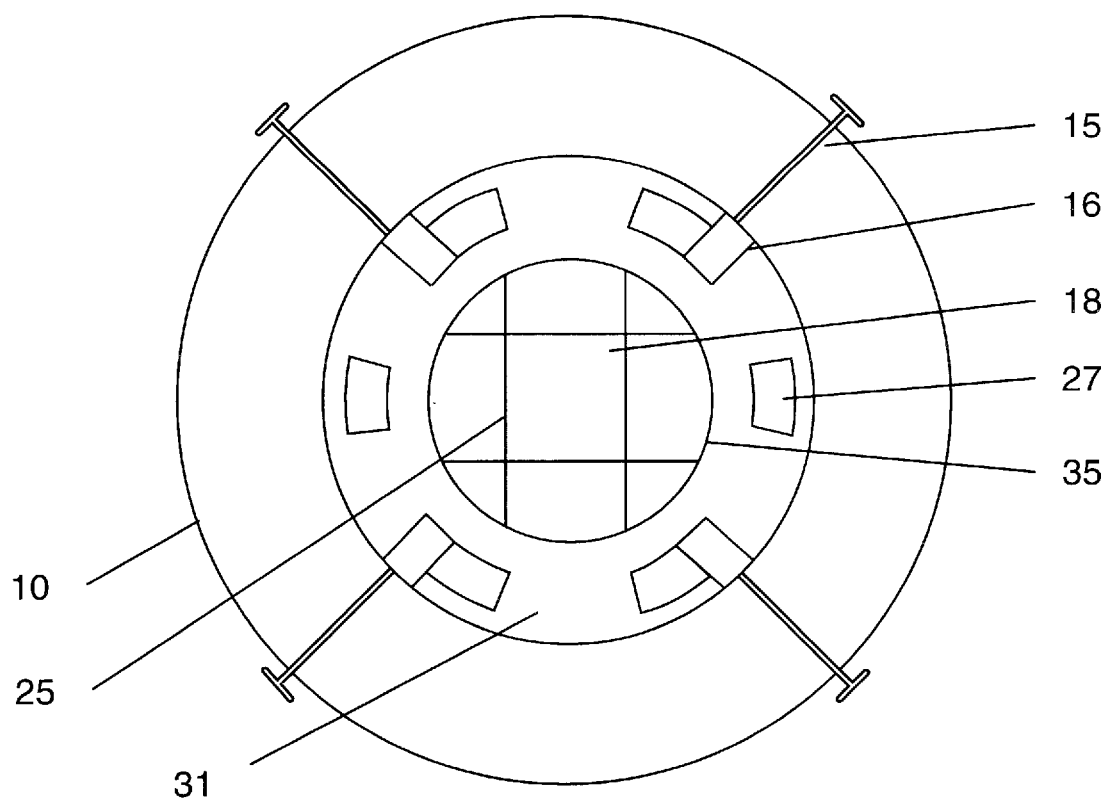

FIG. 5 shows a top plan view of FIG. 3.

Figure 6:
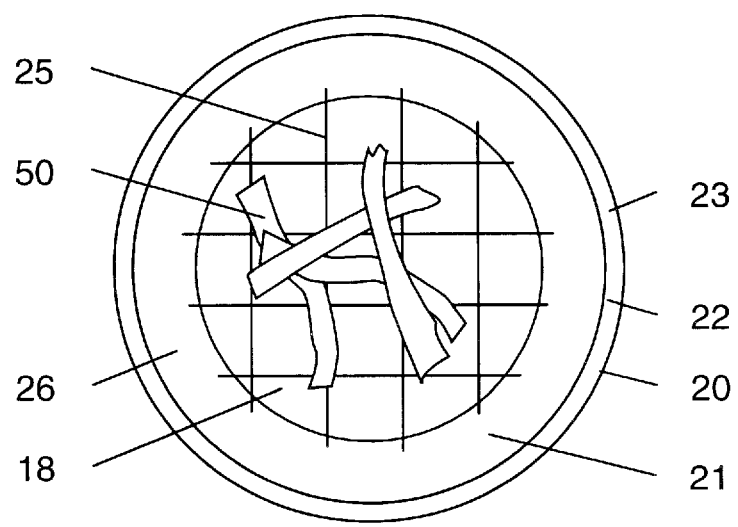

FIG. 6 shows a top view of FIG. 3 with cut-a-way of top plate, and with chimney removed.

Figure 7:
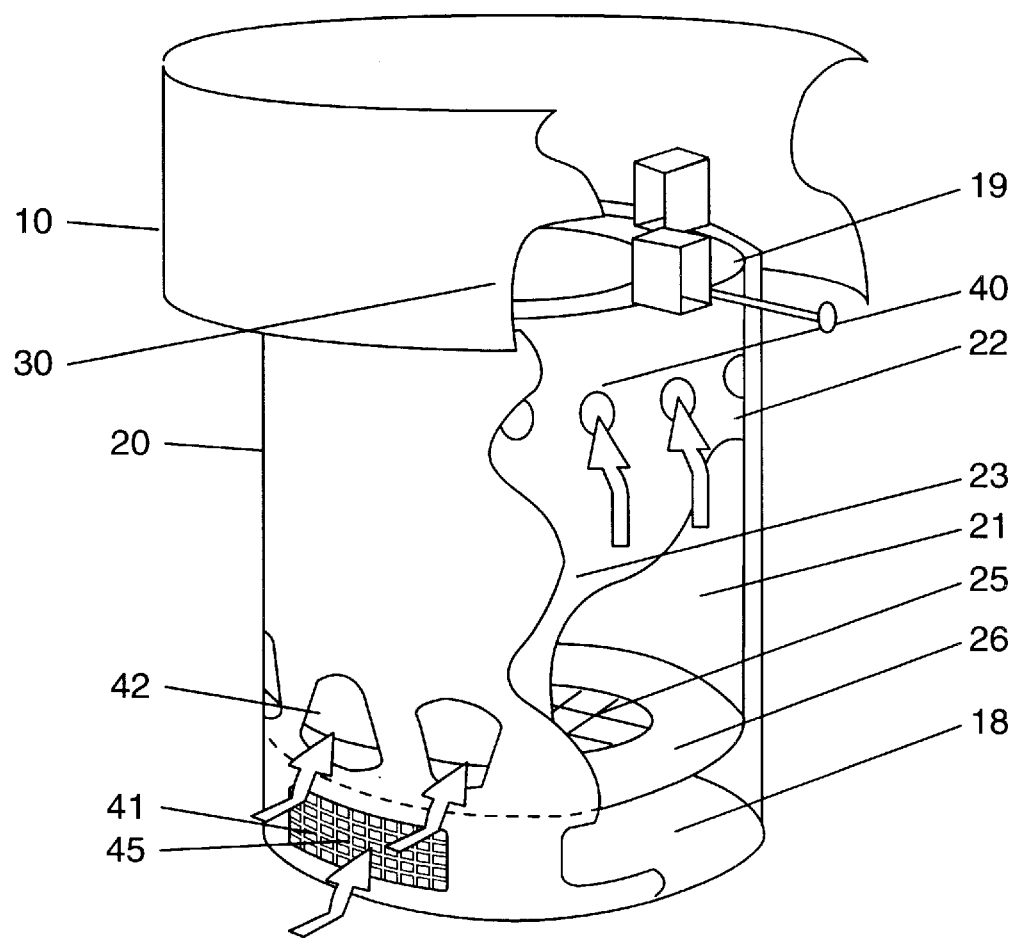

FIG. 7 shows a perspective view with cut-a-ways of chimney, outer wall, and combustion-chamber wall.

REFERENCE NUMERALS IN DRAWING

| | |
|---|---|
| 5 cook pot | 6 wire handles |
| 7 handle attachments | 8 pots's rims |
| 10 chimney | 11 chimney pin |
| 12 closed chimney notch | 13 opened chimney notch |
| 15 chimney supports | 16 chimney support brackets |
| 18 bottom plate | 19 top plate |
| 20 outer wall | 21 combustion-chamber |
| 22 combustion-chamber wall | 23 adjacent confining airspace |
| 25 fuel grate | 26 grate-base |
| 27 vented-fire-ring | |
| 30 chimney stokehole | 31 vented-fire-ring stokehole |
| 35 exhaust vent | 40 aperture jets |
| 45 wire mesh | 41 primary air intake apertures |
| 50 solid-fuel | 42 secondary air intake apertures |

DESCRIPTION-FIGS. 1 TO 7

Two cook pots 5 closed at pots's rims 8 encase portable wood burning camp stove (FIG. 1).

An outer wall 20 (FIGS. 2,3,7) defines the lateral and external form of the stove, and supports members essential for said stove's performance. The outer wall connects to a bottom plate 18 (FIG. 4). A first ring of primary air intake apertures 41 are covered with wire mesh 45 (FIGS. 3,7) and are located along the outer wall adjacent to the bottom plate. Above the first ring of the primary air intake apertures, on the interior of the stove, stands grate-base 26 supporting fuel grate 25, defining the lower plane of combustion-chamber 21 (FIGS. 6,7). A second ring of secondary air intake apertures 42 (FIGS. 3,7) are located in the stove's outer wall, above the grate-base supporting the attached fuel-grate. The combined cross-section area of secondary air intake apertures is larger than the cross section area of a third ring of aperture jets 40 (FIG. 7). The grate-base connects to the bottom of the combustion-chamber and to inside of the outer wall, closing an adjacent confining airspace 23 at its lower end (FIG. 7). The combustion-chamber's diameter is defined by interior of combustion-chamber wall 22 (FIG. 6,7). The adjacent confining airspace has its lateral space defined by a distance between the combustion-chamber wall and the outer wall (FIGS. 6,7). A third ring of aperture-jets 40 cut through an upper-portion of the combustion-chamber-wall (FIG. 7). A top-plate 19 (FIGS. 2,5,7) defines height of the combustion-chamber and also closes top vertical end of the adjacent confining airspace between the combustion-chamber wall and the outer wall. Exhaust vent 35 is centered in the top plate (FIGS. 2,5).

A vented-fire-ring 27 is attached to the top-plate, creating a support on which the cook pots rest (FIGS. 2,5). Chimney supports 15 extend through chimney support brackets 16 attached to the top plate (FIG. 5).

Chimney pin 11 inserts into closed chimney notch 12 when chimney is wrapped around stove for encasing between the two cook pots (FIGS. 2,2-A). The chimney pin also inserts into opened chimney notch 13 to fix chimney's 10 cylindrical form (FIG. 2-A)

OPERATION-FIGS. 1, 2, 3, 5, 6, 7

The manner to set up and operate the portable wood burning burning camp stove is straight forward. Cook pots 5 (FIG. 1) are pulled apart at pots's rims 8. Stove is stood upright (FIG. 2) with bottom-plate 18 on a non-combustable surface. By pushing chimney 10 together with hands, chimney-pin 11 is detached from closed-chimney-notch 12 and moved to opened-chimney-notch 13 (FIG. 2-A), creating chimney's cylindrical form. Chimney-supports 15 are extended (FIG. 5) through chimney-support-brackets 16, and the chimney is rested on the chimney-supports. Chimney-stokehole 30 is lined up with a selected vented-fire-ring stokehole 31 (FIG. 3).

Ignited fuel, such as burning paper, is dropped through exhaust-vent 35 (FIGS. 2,5) into combustion-chamber 21 to rest on fuel-grate 25 (FIG. 7). Solid-fuel 50 (FIG. 6), such as twigs of diameters and lengths approximating an adult's index finger, both in length and girth, are dropped on top of paper burning on the fuel grate in the combustion chamber.

As introduced fuel ignites and combusts, air is drawn through primary air intake apertures 41 and wire mesh 45 (FIG. 7). As the solid-fuel (twigs) undergoes primary combustion, ligneous gases are released and flow with the stove's flue effect to an upper portion of the combustion-chamber. With fuel igniting, thermal communication occurs, whereby a percent of generated heat passes by means of surface conduction through combustion-chamber wall 22 to heat air in adjacent confining airspace 23 that is constrained laterally by outer-wall 20 (FIGS. 6,7).

As air in the adjacent confining airspace is heated, it expands and rises vertically but is kept from rising higher than top-plate 19 (FIGS. 2,7) that forms a seal between the combustion-chamber wall and the outer wall. As heated air expands and rises, an environment of positive pressure is created, and the outlet of said heated air is through an annular ring of aperture jets 40. Said aperture jets, cut through the upper portion of the combustion-chamber wall (FIG. 7), allow said heated air to be propelled directly into the inner combustion-chamber, where said air encounters gases released in combustion that are ascending with the flue effect upward to the upper portion of the combustion-chamber. The propelling of heated air through the annular ring of aperture jets, and its mixing with ascending gases released from the fuel combusting on the fuel grate, induces a dramatic reignition of said gases.

Wire handles 6 of the cook pots (FIG. 1) are rotated in sockets of handle attachments 7, creating a handle that extends from side of cook pot. One at a time, cook pots filled with contents to be heated, are placed on vented-fire-ring 27 with the wire handles extended horizontally at a height above top of the chimney (FIG. 3).

For continuous combustion, solid-fuel is added after combustion is initiated, by pushing fuel horizontally through chimney-stokehole 30 and vented-fire-ring-stokehole 31 (FIG. 3), where solid-fuel drops through exhaust vent 35 directly into the combustion-chamber.

After the dramatic reignition of ligneous gases in an upper-portion of the combustion-chamber, combusted gases and flame pass through the exhaust vent in the top plate, and meet the cook pot's bottom surface, and are driven outward. Combusted gases and flame moving outward along the cook-pot's bottom surface shoot through spaces in the vented fire ring. Upon reaching interior surface of the chimney, flame and gases bend upward to contact sides of the cook pot. Then ascending gases pass into the atmosphere.

SUMMARY, RAMIFICATIONS, AND SCOPE

Accordingly, the reader will see that the "portable wood burning camp stove" of the invention disclosed can be used for continuous combustion, and thus cooking and heating, so long as solid-fuel of appropriate size and combustable quality is continuously introduced through the stoke holes in the chimney and the vented-fire-ring, down through the exhaust-vent and into the combustion-chamber.

it permits pieces of solid-fuel, especially small twigs easily gathered in Nature, to serve as a plentiful and effective fuel for cooking and heating;

it utilizes an effective form of secondary combustion which contributes to extracting exceptionally higher temperatures from combusting fuel, and concentrates released heat to the service of heating contents in a cook pot;

it permits a high degree of control over rates of combustion, and hence heat emitted from solid-fuels for cooking and heating, through the rate fuel is stoked into the combustion chamber;

it permits combustion of twigs and wood pieces in an environment contained and controlled to a degree that reduces, when compared to open fire, the danger of fire spreading to other materials;

it permits the combustion of solid-fuels, such as twigs, in a contained environment that effectively reduces ash and smoke emissions;

it allows for reduced environmental impact of campers customarily using fires for cooking, as solid-fuel requirements can be limited to twigs fallen from trees and bushes;

it allows for the stove user to limit detection of location, as emissions released during combustion can be rendered mostly undetectable to the eye;

Although the description above contains many specificities, these should not be construed as limiting the scope of the invention but as merely providing illustrations of some of the presently preferred embodiments.

It is contemplated that stove and cook-pots can have a variety of sizes and dimensions, and can be made octagonal and squared, as examples. Said stove can also be cone-shaped.

Said stove can have attached flue for drawing away emissions.

Said stove can be carried and used without requiring the encasing cook-pots.

Said stove can be manufactured from readily available materials. The preferred embodiment is comprised of metal, more particularly sheet steel, and preferably stainless steel, to withstand high temperatures and repeated firings with a reduced rate of oxidation and corrosion from acids in burned fuels. However, it is contemplated that copper, aluminum, low carbon sheet steel, a variety of ferrous alloys, ceramic materials, and a host of man-made materials can be used for manufacture of the present invention. It is contemplated that stove can be constructed with joints that are crimped, riveted, welded, cast, soldered, and glued.

Thus the scope of the invention should be determined by the appended claims and their legal equivalents, rather than by the examples given.

I claim:

1. A stove comprising:
   a. an inner combustion-chamber, said chamber defined by at least one substantially upright chamber wall and a chamber floor;
   b. at least one outer wall defining an airspace between said chamber wall and said outer wall, said chamber wall and said outer wall joined together to form a closed top of said airspace;
   c. said combustion-chamber including primary combustion air passageway proximate said floor of said combustion-chamber;

d. said outer wall and said airspace both including upper and lower portions, said lower portion of said outer wall including a lower air passageway into said lower portion of said airspace; and e. said combustion-chamber and said chamber wall both having upper and lower portions, said upper portion of said chamber wall including a secondary combustion air passageway in communication between said upper portion of said airspace and said upper portion of said combustion-chamber.

2. The stove of claim 1 wherein said primary combustion air passageway and said lower air passageway in said outer wall are in communication with air at ambient pressure.

3. A method for efficiently burning fuel in a stove, said method including:

a. providing an inner combustion-chamber having upper and lower portions, said combustion-chamber defined by at least one substantially upright chamber wall and a chamber floor;

b. providing at least one outer wall having upper and lower portions joined to top of said chamber wall, which together with said chamber wall defines a confining airspace closed at the top, said airspace having upper and lower portions;

c. introducing air to said lower portion of said combustion-chamber to facilitate fuel combustion and the release of combustible gases to said upper portion of said combustion-chamber;

d. introducing secondary combustion air into said airspace proximate said lower portion of said airspace;

e. heating said secondary combustion air by thermal contact with said chamber wall, permitting heated secondary combustion air to expand and rise towards said top of said airspace; and f. introducing said heated secondary combustion air into said upper portion of said combustion-chamber through a passageway in said upper portion of said chamber wall.

4. The method of claim 3 wherein said heated secondary combustion air is introduced into said top of said combustion-chamber across a pressure gradient.

5. The method of claim 4 wherein said heated secondary combustion air is propelled out of an environment of positive pressure to mix with said combustible gases released in primary combustion.

6. The method of claim 5 wherein said heated secondary combustion air mixes with said combustible gases released in primary combustion and reignights said combustible gases.

* * * * *